(12) United States Patent
Barber (10) Patent No.: US 9,061,793 B2
(45) Date of Patent: Jun. 23, 2015

(54) COVER FOR FOOD HOLDER

(75) Inventor: Thomas Barber, Redondo Beach, CA (US)

(73) Assignee: BRADSHAW INTERNATIONAL, INC., Rancho Cucamonga, CA (US)

( * ) Notice: Subject to any disclaimer, the term of this patent is extended or adjusted under 35 U.S.C. 154(b) by 1211 days.

(21) Appl. No.: 12/955,682

(22) Filed: Nov. 29, 2010

(65) Prior Publication Data
US 2012/0132652 A1   May 31, 2012

(51) Int. Cl.
| | |
|---|---|
| A47J 39/00 | (2006.01) |
| B65D 25/28 | (2006.01) |
| B65D 6/00 | (2006.01) |
| B65D 5/46 | (2006.01) |
| B65D 51/16 | (2006.01) |

(52) U.S. Cl.
CPC .......... B65D 11/105 (2013.01); B65D 5/46064 (2013.01); B65D 5/46184 (2013.01); A47J 39/006 (2013.01); B65D 25/2858 (2013.01); B65D 51/1605 (2013.01)

(58) Field of Classification Search
CPC ............................ A47J 39/00; B65D 25/2858
USPC .................................. 220/573.1, 759; 99/403
See application file for complete search history.

(56) References Cited

U.S. PATENT DOCUMENTS

| | | | |
|---|---|---|---|
| 1,719,842 A | 7/1929 | Jackson | |
| 2,347,041 A | 4/1944 | Filsinger | |
| 2,354,822 A | 8/1944 | Meyran | |
| 2,559,196 A * | 7/1951 | Medved | 99/422 |
| 2,667,829 A | 2/1954 | McNutt | |
| 2,789,873 A | 4/1957 | Gonder | |
| 2,965,430 A | 12/1960 | Garner | |
| 3,060,838 A | 10/1962 | Priore | |
| 3,182,397 A | 5/1965 | Entenmann | |
| 3,194,460 A | 7/1965 | Tupper | |
| 3,908,887 A | 9/1975 | Leto | |
| 3,991,902 A * | 11/1976 | Ford, Jr. | 220/324 |
| 4,170,302 A | 10/1979 | Baca | |
| 4,351,164 A | 9/1982 | Christiani | |
| 4,520,633 A | 6/1985 | Hoydic | |
| 5,042,712 A | 8/1991 | DeRoseau | |
| 5,090,572 A | 2/1992 | DeRoseau | |
| 5,251,758 A | 10/1993 | Kolacek | |
| 5,695,084 A | 12/1997 | Chmela et al. | |
| 5,705,212 A | 1/1998 | Atkinson | |
| D396,752 S | 8/1998 | Hines | |
| D413,046 S | 8/1999 | Fritze | |
| 5,938,066 A | 8/1999 | DeMars | |
| 6,371,624 B1 | 4/2002 | Dorney | |
| 6,604,646 B2 | 8/2003 | Torniainen et al. | |

(Continued)

FOREIGN PATENT DOCUMENTS

| | | |
|---|---|---|
| GB | 2331060 A | 5/1999 |
| WO | WO 88/08782 A1 | 11/1988 |

Primary Examiner — Fenn Mathew
Assistant Examiner — Kevin Castillo
(74) Attorney, Agent, or Firm — Birch, Stewart, Kolasch & Birch, LLP (57) ABSTRACT

A cover for a food holder includes a body having an inner surface and an outer surface, the body having at least one aperture provided therein, the at least one aperture providing communication between the inner surface and the outer surface; and a serving implement having a first portion extending through the aperture along one of the inner and outer surfaces, and a second portion extending along the other of the inner and outer surfaces.

5 Claims, 12 Drawing Sheets

(56) References Cited

U.S. PATENT DOCUMENTS

| | | |
|---|---|---|
| D483,988 S | 12/2003 | Kipperman et al. |
| 6,688,469 B1 | 2/2004 | Barnes |
| D528,432 S | 9/2006 | Snedden et al. |
| D530,160 S | 10/2006 | Maltese et al. |
| 7,225,937 B2 | 6/2007 | Schroeder |
| D577,962 S | 10/2008 | Bauer et al. |
| D598,711 S | 8/2009 | Franco |
| 7,614,518 B2 | 11/2009 | Barber |
| 2003/0029868 A1 | 2/2003 | Davidov et al. |
| 2004/0094548 A1 | 5/2004 | Laveault |
| 2007/0180850 A1 | 8/2007 | Thompson |
| 2008/0087037 A1 | 4/2008 | Rapaz |
| 2009/0120942 A1 | 5/2009 | Vovan |

\* cited by examiner

COVER FOR FOOD HOLDER

BACKGROUND OF THE INVENTION

1. Field of the Invention

The present invention is generally directed to a cover for a food holder and, more particularly, to a cover for a food holder having an aperture to hold a serving implement.

2. Description of Related Art

Conventional food holders for baked goods generally take the form of a metal or plastic pan. The food holders may be square, rectangular, or circular depending on the type of baked goods stored therein. For example, cupcake or muffin pans may be rectangular and include a plurality of recessed shapes to hold individual cupcakes or muffins. Pie pans are generally circular pans with a single large recessed bottom. Cake pans may come in rectangular or circular shapes depending on the desired shape of the cake. Often times, the pan may be the same pan used to bake the baked goods. These pans may also include handles formed in the outer rim of the pans.

Typically, these food holders are provided with a cover to maintain the freshness of the baked goods and to generally protect the baked goods from the environment, such as insects, dust, and other nuisances. These covers are designed to rest on the rims of the pans and are generally formed with one or more sidewalls and a top wall. Generally, the covers are made of a plastic material; however, some may be made of glass.

Depending on the type of baked goods, it is often necessary to have a serving implement available to remove the baked goods from the pan and/or display the baked goods outside of the pan. As such, it is often necessary to carry these serving implements separately from the conventional food holders. While it may be possible to place the serving implement with the baked goods underneath the cover, the serving implement may come in contact with the baked goods and adversely effect the presentation of the baked goods, as well as cause a portion of the baked goods to stick to the handled of the serving implement.

BRIEF SUMMARY OF THE INVENTION

According to principles of this invention, a cover for a food holder is provided that advantageously carries or holds the serving implement in a manner that the serving implement will not come in contact with the baked goods. In addition, depending on the shape of the serving implement, the cover may be configured in a manner where a portion of the serving implement is graspable by a user such that the grasped portion of the serving implement acts as a handle to carry the cover and food holder.

In accordance with principles of this invention, a cover for a food holder includes a body having an inner surface and an outer surface, the body having at least one aperture provided therein, the at least one aperture providing communication between the inner surface and the outer surface; and a serving implement having a first portion extending through the aperture along one of the inner and outer surfaces, and a second portion extending along the other of the inner and outer surfaces.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

In the following detailed description, reference is made to the accompanying drawing figures which form a part hereof, and which show by way of illustration exemplary embodiments of the invention. It is to be understood by those of ordinary skill that other embodiments may be provided without departing from the scope of the present invention. Wherever possible, the same reference numbers will be used throughout the drawings to refer to the same or similar parts.

Figure 1:
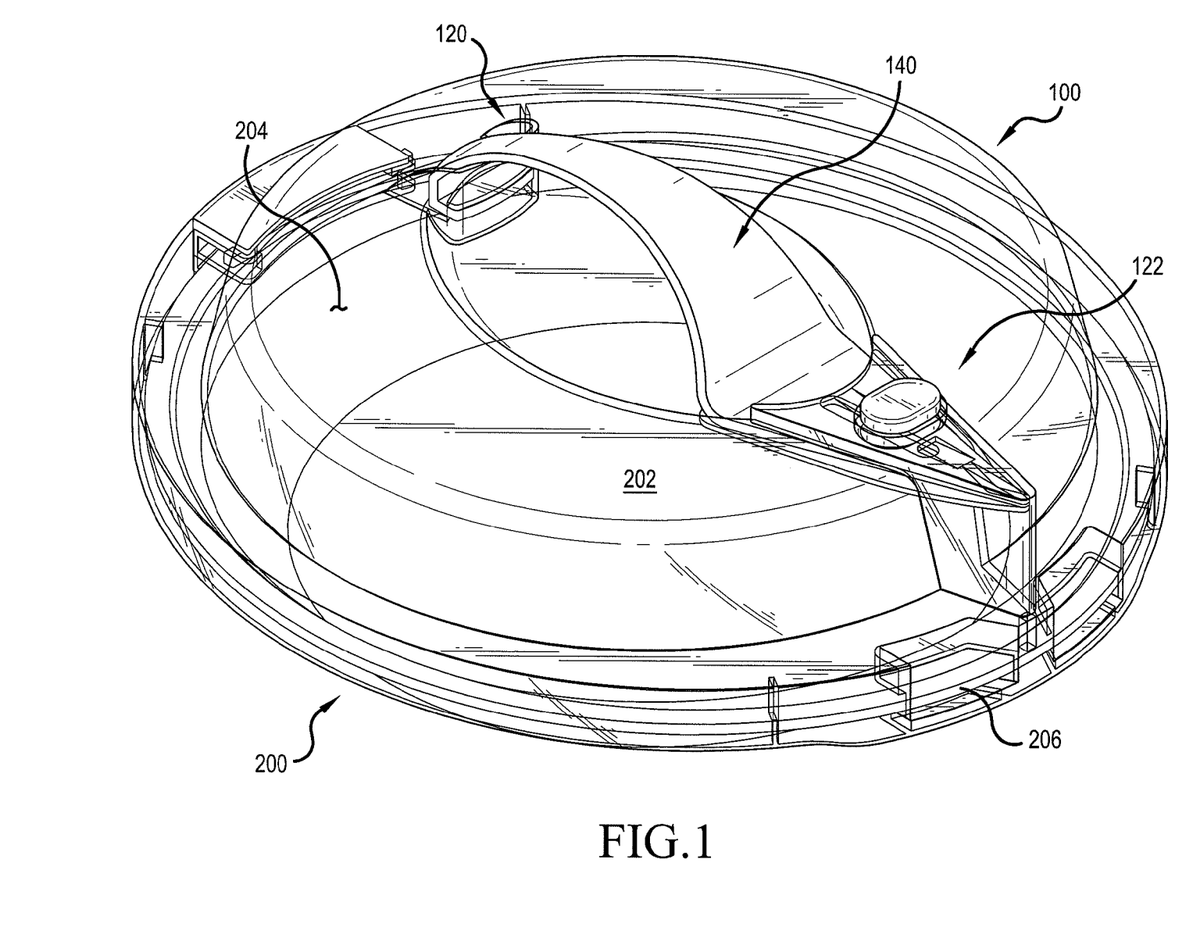
FIG. 1 is a perspective view of a cover and food holder assembly according to a first exemplary embodiment.
Figure 2:
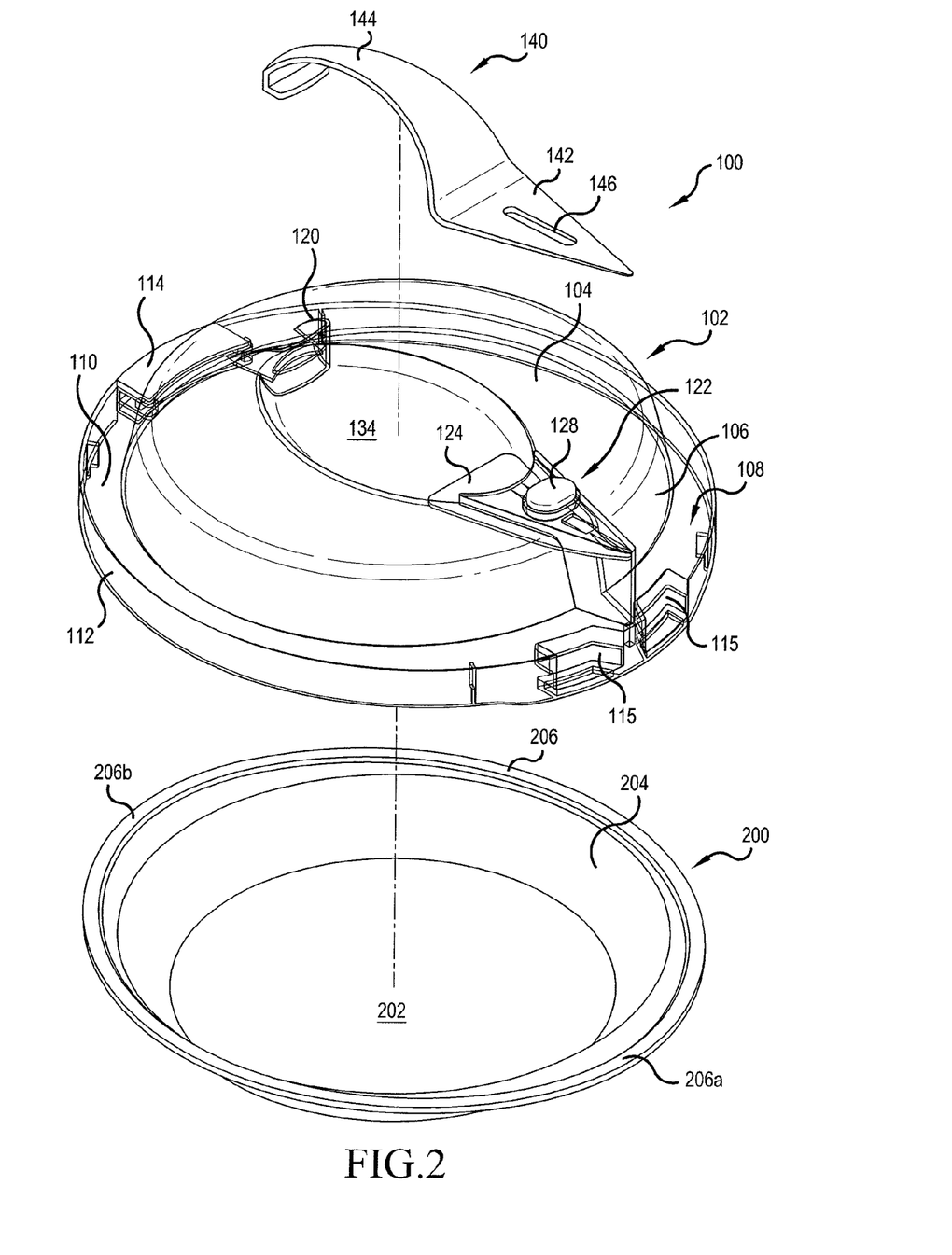
FIG. 2 is an exploded perspective view of the cover and food holder assembly of FIG. 1.
Figure 3:
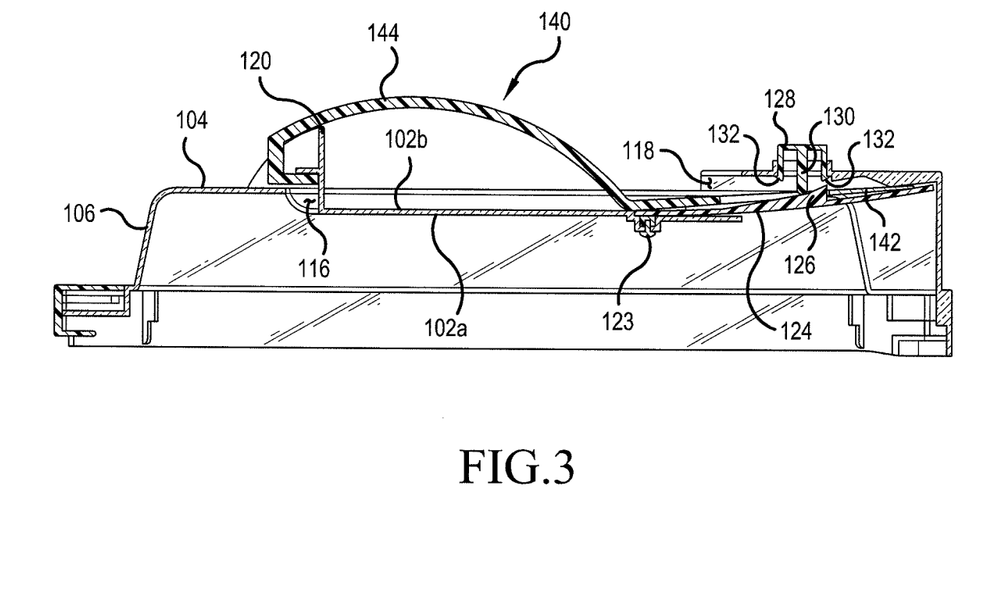
FIG. 3 is partial cross-sectional view of the cover and serving implement of FIG. 1.

As shown in FIGS. 1-3, a first exemplary embodiment of a covered food holder is in the form of a covered pie holder. The covered food holder includes a cover 100 and a pan 200. In this first exemplary embodiment, the pan 200 includes a recessed bottom 202, a sidewall 204 extending up from the bottom 202, and a rim 206 formed at an upper edge of the sidewall 204. The cover 100 rests on the rim 206. As best seen in FIG. 2, the rim 206 may have a non-uniform shape to provide handle portions 206a and 206b.

The cover 100 includes a cover body 102 having a top wall 104, a sidewall 106 extending down from the top wall 104, and a rim 108 extending from the sidewall 106. The rim 108 includes a ring-shaped wall 110 extending substantially parallel to the top wall 104 and a sidewall 112 extending downward from an outer edge of the ring-shaped wall 110. A latch mechanism 114 is provided at the rim 108 and is configured to secure the cover 100 to the rim 206 of the pan 200 in a conventional manner. A pair of notches 115 is provided in the rim 108 opposite the latch mechanism 114. The notches 115 are configured to receive the rim 206 therein. The cover body 102 of the cover 100 provides an inner surface 102*a* that faces the pan 200 and an outer surface 102*b* exposed to the environment. In this exemplary embodiment, the latch mechanism 114 engages handle portion 206*a* and the notches 115 receive the handle portion 206*b*.

The cover body 102 includes two apertures 116 and 118 (best seen in FIG. 3) provided in the top wall 104. The apertures 116 and 118 allow communication between the inner surface 102*a* and outer surface 102*b*. The apertures 116 and 118 assist in releasably securing a serving implement 140 to the cover body 102, which will be described in greater detail below. Attachment means 120 is provided adjacent aperture 116 and a releasing mechanism 122 is provided adjacent aperture 118.

The releasing mechanism 122 includes a biasing member 124 that is attached to the top wall 104 by one or more fasteners 123. The biasing member 124 may include a gradually raised ridge 126 that contacts an actuatable member 128, such as a pressable button. The actuatable member 128 includes a protruding member 130 that extends towards the biasing member and is arranged such that the protruding member 130 displaces the biasing member 124 downward when pressed. The actuatable member 128 includes a pair of pawls 132 that engage the inner surface 102*a* when pressed upward by the biasing member 124. In this manner, the actuatable member 128 is secured to cover body 102.

The cover 100 also includes a serving implement 140 that is releasably secured to the body 102. The serving implement 140 includes a first portion 142 that extends through the aperture 118 and a second portion 144 outside of aperture 118. As such, the first portion 142 extends along the inner surface 102*a* while the second portion extends along the outer surface 102*b*. Because the second portion 144 of the serving implement 140 extends along the outer surface 102*b*, the second portion 144 is graspable by a user so that the cover and food holder assembly can be carried. In this first exemplary embodiment, the serving implement 140 also serves the role of a handle for the cover 100 when connected to the cover 100. To further assist in making the second portion 144 graspable by the user, the body 102 can have a recessed portion 134 extending between the attachment means 120 and the aperture 118.

In this first exemplary embodiment, the serving implement 140 is a pie server where the first portion 142 is in the form of a triangular shaped member and the second portion 144 is in the form of a handle connected to the triangular shaped member. The first portion 142 may include a slot 146 so that the protruding member 130 can extend therethrough to contact the biasing member 124. As shown in FIGS. 1-3, the biasing member 124 may have substantially the same shape as the first portion 142 of the serving implement.

With the foregoing arrangement, the serving implement 140 can be releasably attached to the body 102 of the cover 100. Specifically, the first portion 142 is inserted through aperture 118 thereby depressing the biasing member 124 downward until the ridge 126 is received in the slot 146. The end of the second portion 144 opposite the first portion 142 can engage the attachment means 120 to further hold the serving implement 140 in place. Once assembled, the cover 100 can be carried by the second portion 144 of the serving implement 140. To release the serving implement 140, the actuatable member 128 is pressed downwards toward the biasing member 124. The protruding member 130 presses on the ridge 126 allowing the serving member 140 to be withdrawn from the aperture 118.

Figure 5:
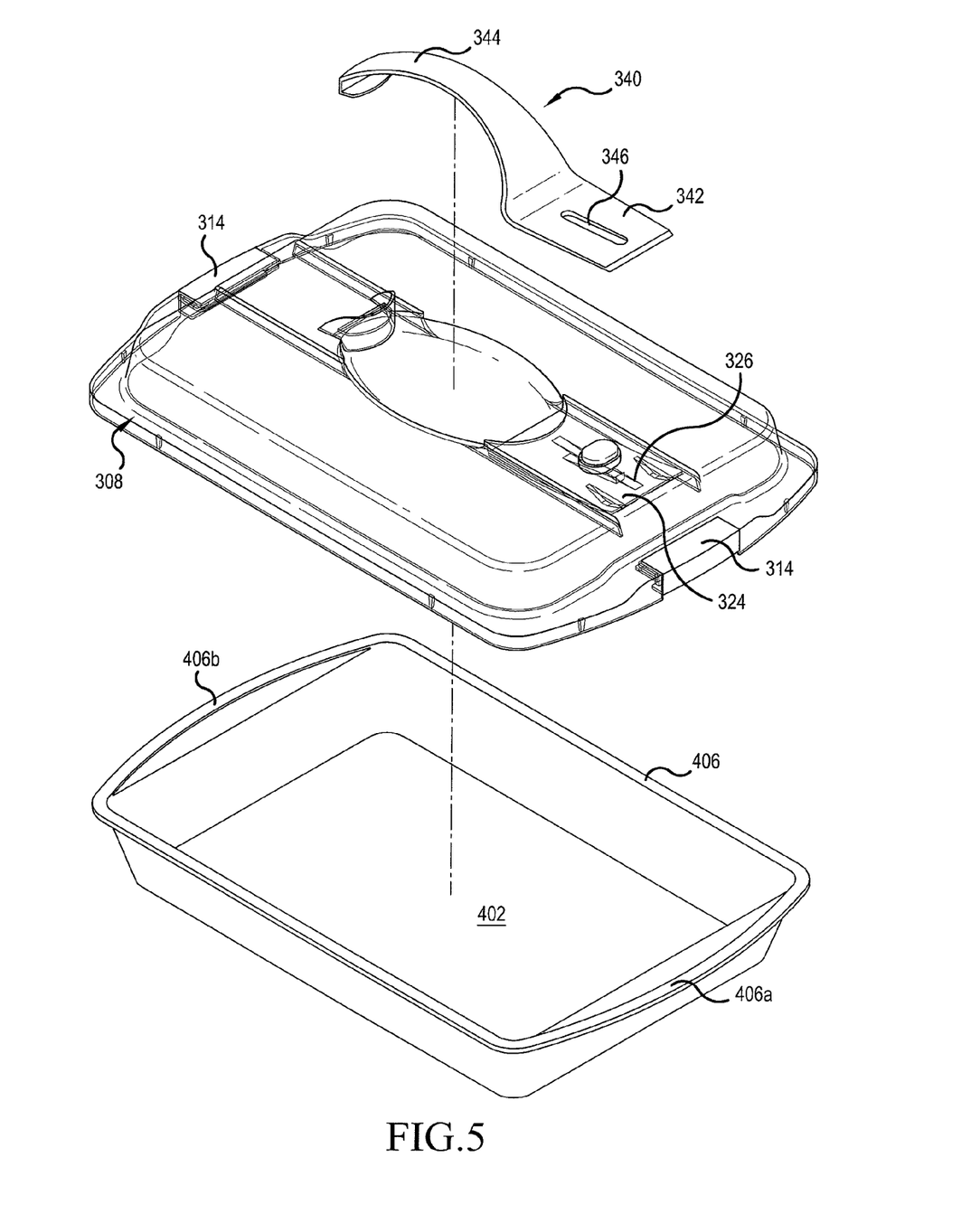
FIG. 5 is an exploded perspective view of the cover and food holder assembly of FIG. 4.
Figure 6:
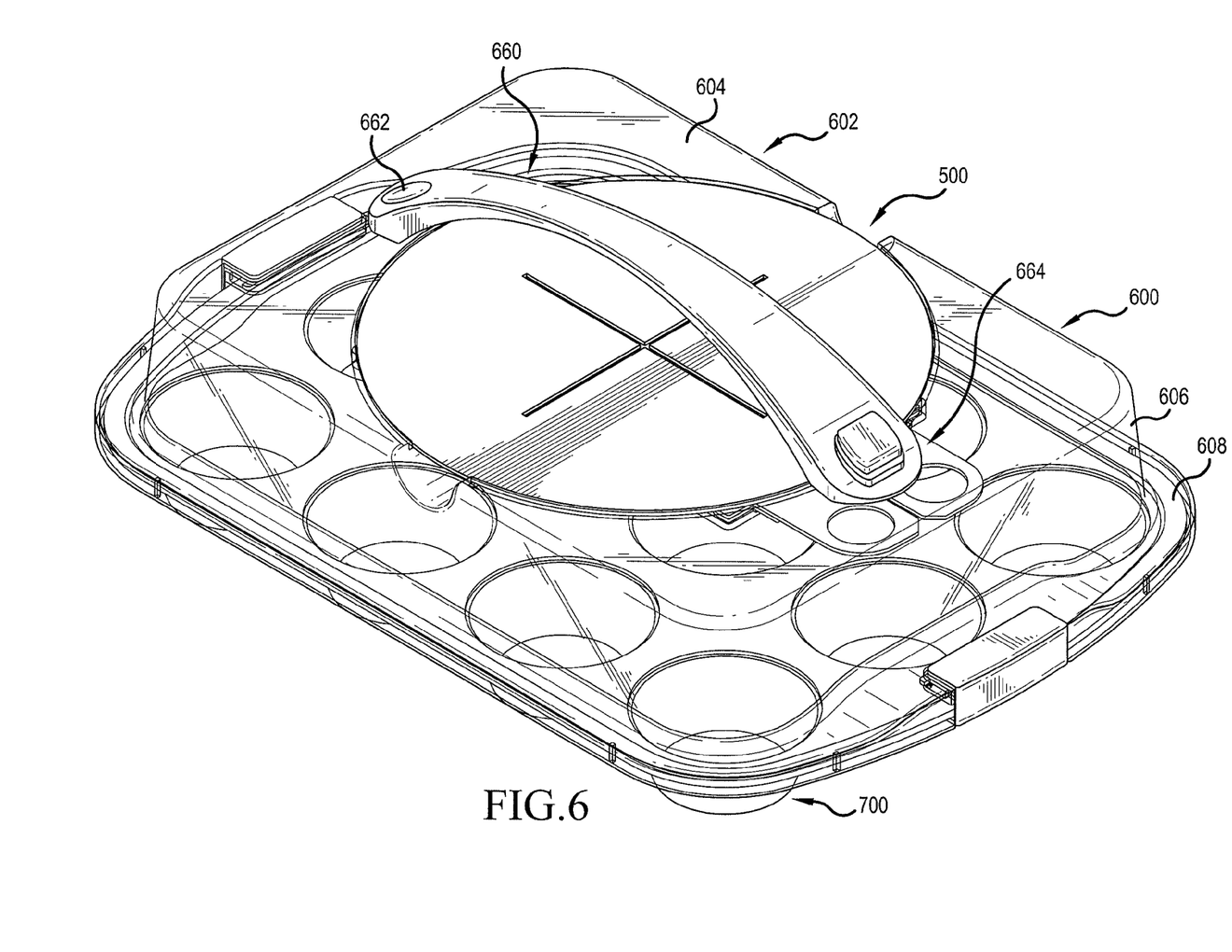
FIG. 6 is a perspective view of a cover and food holder assembly according to a third exemplary embodiment.

While the first exemplary embodiment is explained with reference to a cover for a pie pan, the present invention is not so limited. For example, as shown in FIGS. 5 and 6, a second exemplary embodiment is directed to a cover for a cake pan. The cover 300 and food holder 400 are similar to those described above with reference to the first exemplary embodiment. Therefore, only those features that are different will be described in detail.

Figure 4:
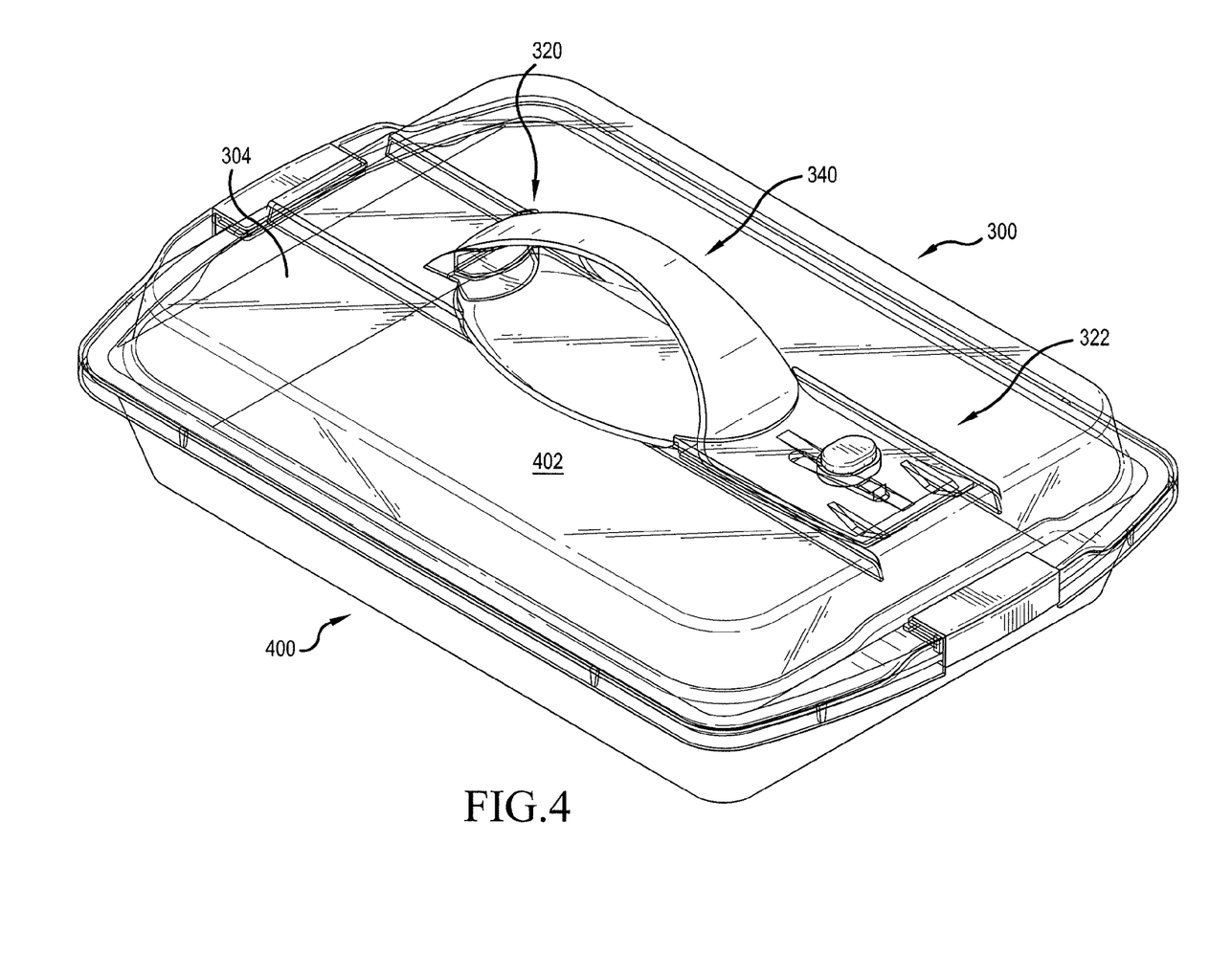
FIG. 4 is a perspective view of a cover and food holder assembly according to a second exemplary embodiment.

The serving implement 340 of the second exemplary embodiment may be a spatula or cake server. The first portion 342 of the serving implement may have a substantially rectangular shape and includes a slot 346 to cooperate with the ridge 326 of the biasing member 324. The biasing member 324 may have substantially the same shape as the first portion 342 of the serving implement 340. The serving implement 340 is releasably secured to the cover 300 in the same manner as described above.

In addition, in this second exemplary embodiment, the pair of notches of the first exemplary embodiment has been replaced with a second latch mechanism 314 that cooperates with the rim 406 of the food holder 400 to secure the cover 300 to the food holder 400. In all other aspects, the cover 300 and serving implement 340 are used in the manner described above.

It should be noted that the various aspects of the first and second embodiments are interchangeable. The latch mechanism of the first embodiment can be used in the second embodiment and vice versa.

As described in the previous two exemplary embodiments the serving implement 140, 340 has been in the form of a utensil for removing food from the food pan; however, it is understood that different serving implements may be used in place of or in addition to serving utensils. One such example, as shown in FIGS. 6-10, is a serving implement in a form of a knock-down stand that can be used to display or otherwise arrange the baked goods. In this exemplary embodiment, a serving implement 500 and cover 600 are provided with a food holder 700.

Figure 7:
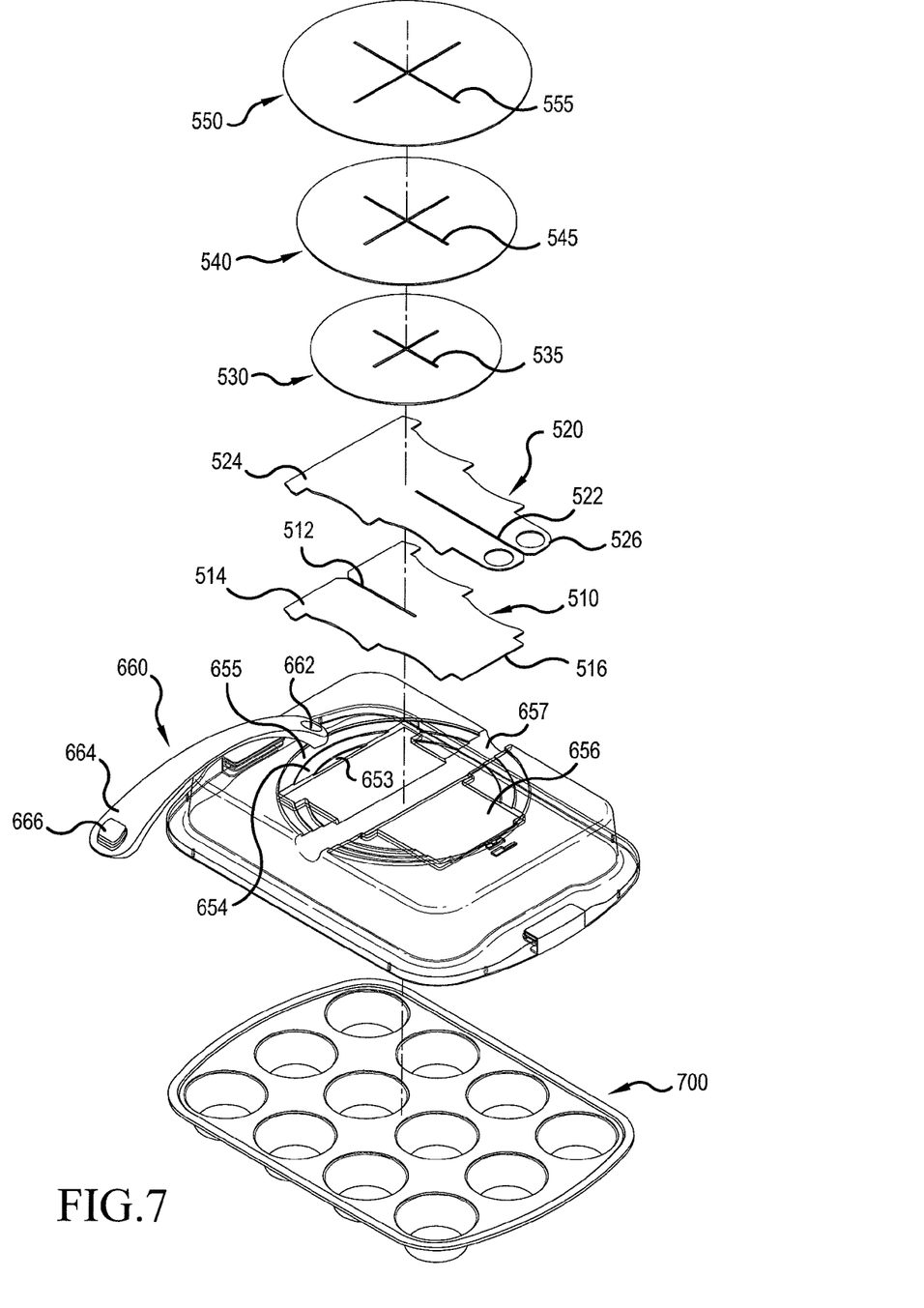
FIG. 7 is an exploded perspective view of the cover and food holder assembly of FIG. 1.

The serving implement 500 includes a pair of interlocking plate members 510, 520 and a plurality of circular plate member 530, 540, 550. As best seen in FIGS. 7 and 9B, interlocking plate member 510 includes a slot 512 extending upwardly from a base portion 514 and an upper edge 516 opposite the base portion 514. Interlocking plate member 520 includes a slot 522 extending downwardly from a handle portion 526 opposite a base portion 524. When assembled, interlocking plate member 510 is received in slot 522 and interlocking plate member 520 is received in slot 512 to define a base 560 for the serving implement 500 (see FIG. 9A). Each of the circular plate members 530, 540, 550, includes a cross-shaped cut-out 535, 545, 555, respectively, such that the circular plate members 530, 540, 550 can be fitted onto the base 560. Once the serving implement 500 is assembled, the baked goods stored in the food holder can be placed on the plate members 530, 540, 550 for display and/or serving. When disassembled, the serving implement 500 can be stored as part of the cover 600, as will be described below.

Figure 8:
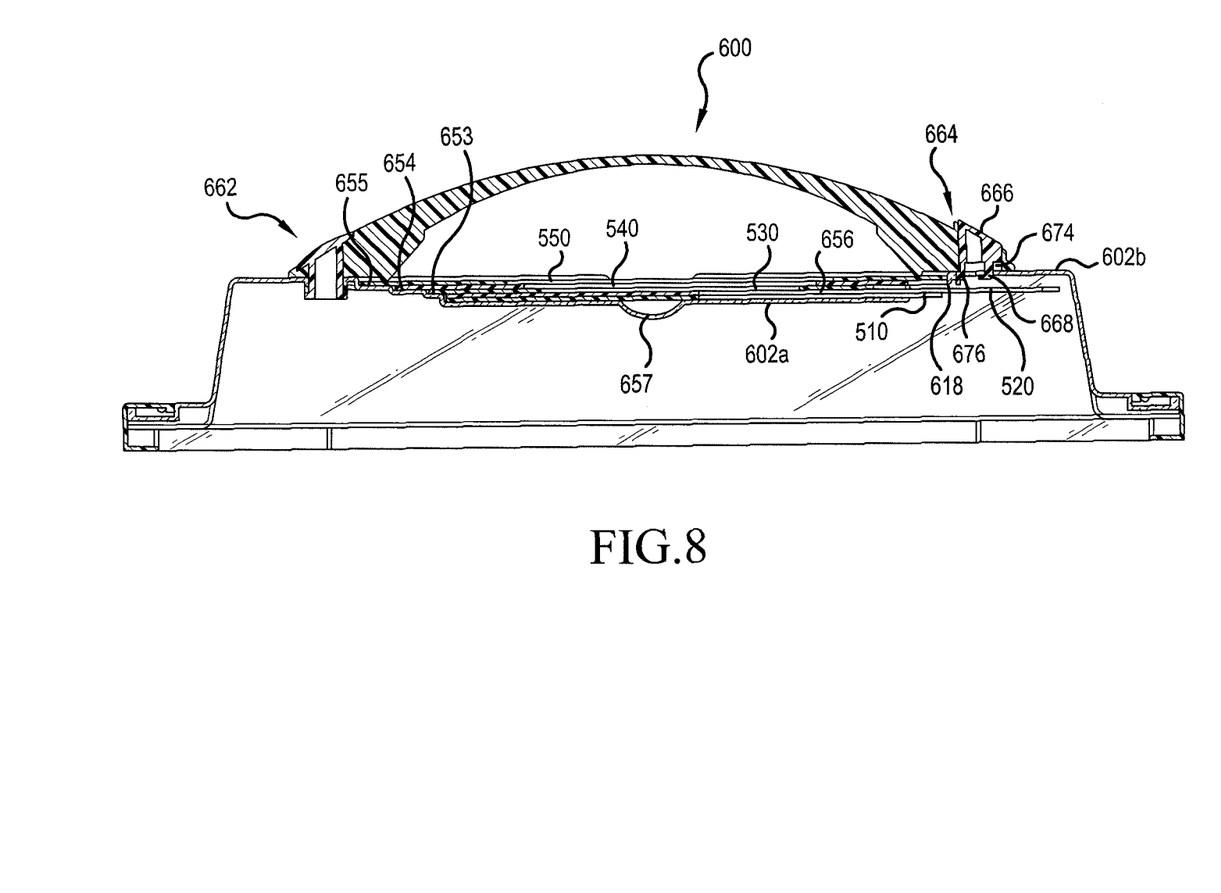
FIG. 8 is a partial cross-sectional view of cover and serving implement of FIG. 6.

The structure of the cover 600 is similar to the previous exemplary embodiments in that the cover includes a body 602 having a top wall 604, a sidewall 606, a rim 608, an aperture 618 providing communication between an inner surface 602*a* and an outer surface 602*b* of the body 602 (shown in FIG. 8). The body 602 includes a plurality of recessed portions including three nested circular portions 653, 654, and 655, and a polygonal shaped portion 656 extending through the nested circular portions 653, 654, 655. The polygonal shaped portion 656 corresponds to the shape of the interlocking plate members 510, 512 and the three nested circular portions 653, 654, 655 are sized to receive the plate members 530, 540, 550, respectively. A groove 657 is also provided in the body 602.

As best seen in FIGS. 6 and 7, serving implement 500, when disassembled, is configured to be stacked in the order of interlocking plate member 510, interlocking plate member 520, circular plate member 530, circular plate member 540, and circular plate member 550. In this configuration, the handle portion 526 extends through aperture 618 to assist in holding the interlocking plate member 510 against the body 602. Accordingly, at least one part of the interlocking member 520 (e.g. handle portion 526) extends along the lower surface 602a of the body 602 and another part of the interlocking member 620 (e.g. base portion 524) extends along the outer surface 602b of the body. Next, the three plate members 530, 540, 550 are then arranged in size of increasing diameter over the interlocking members 510, 520 to assist in holding the lower placed plate members in place. The groove 657 allows the various pieces of the serving implement 500 to be easily removed from the body 602. Finally, a handle 660 is arranged to hold the plate member 550 in place against the body 602.

Figures 9A, 10:
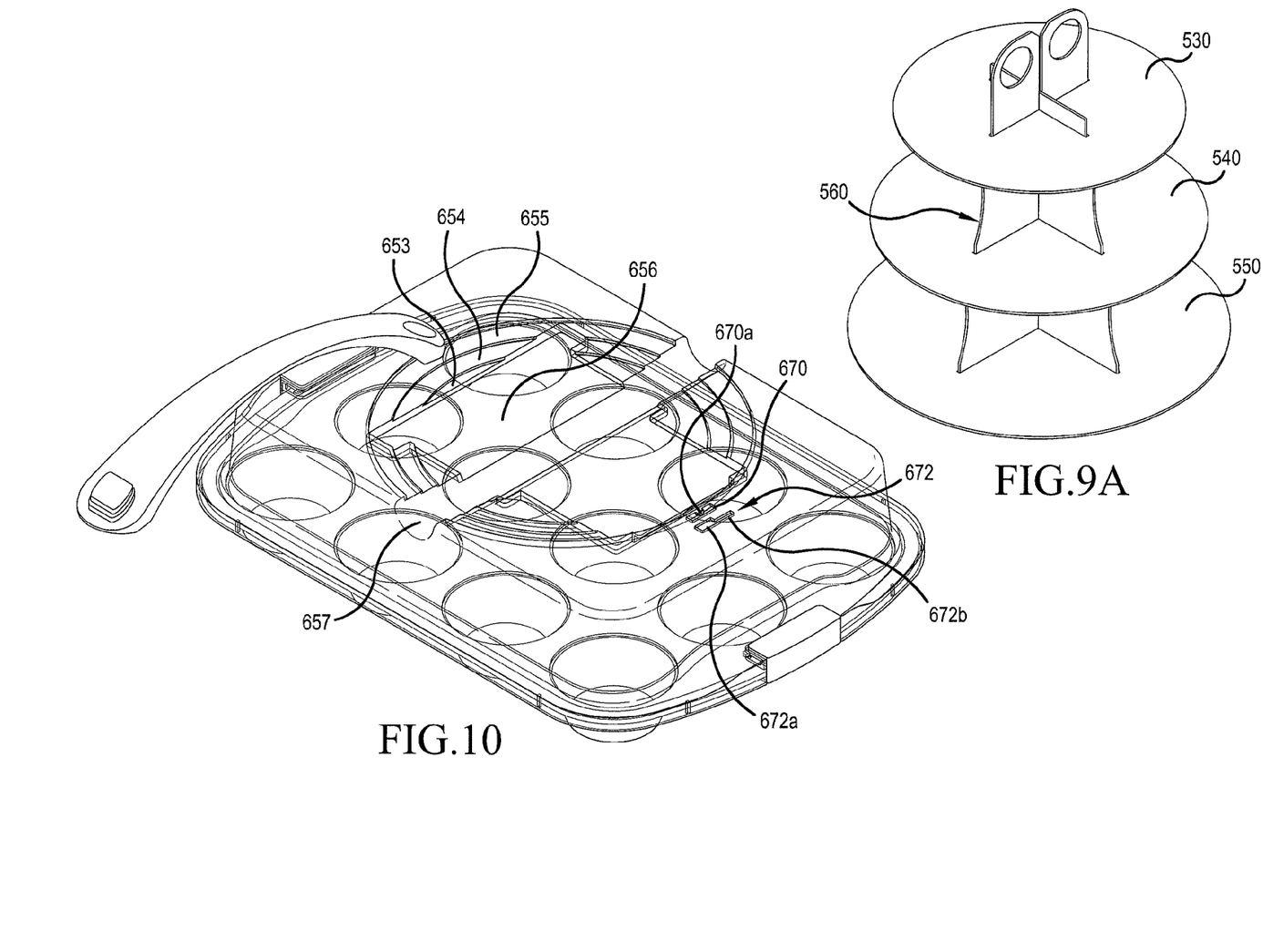
FIG. 9A is a perspective view of the assembled serving implement of the cover of the exemplary embodiment of FIG. 6
FIG. 10 is a perspective view of the cover and food holder assembly of FIG. 6 with the serving implement removed.
Figure 9B:
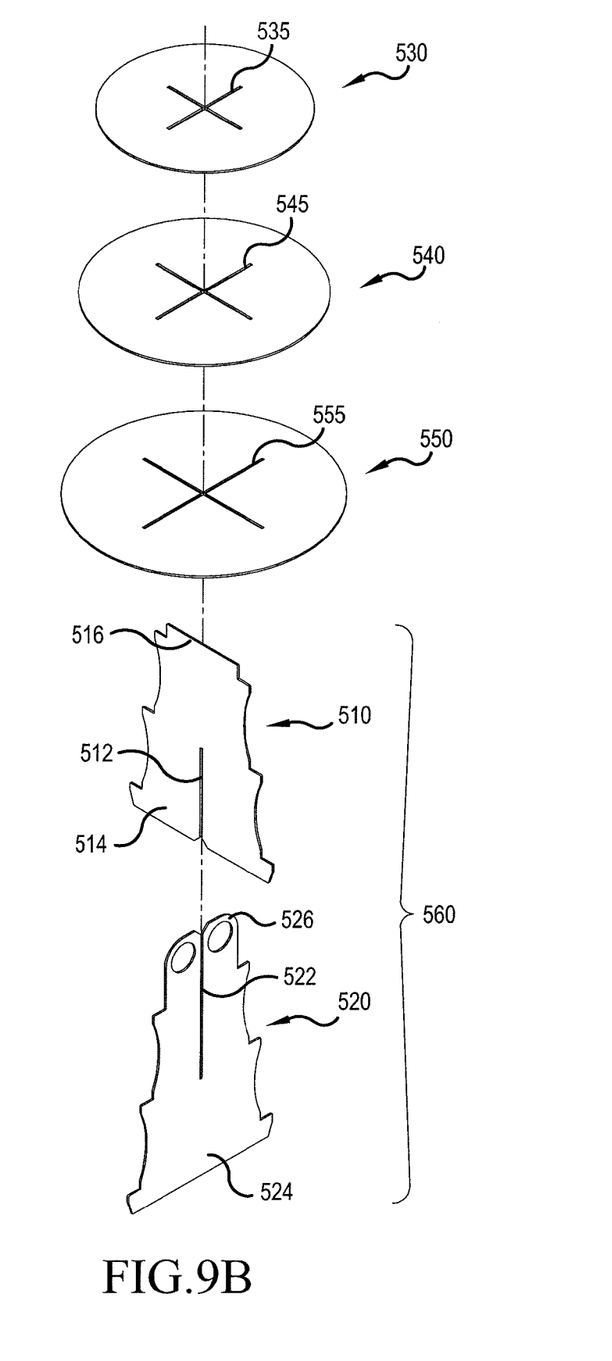
FIG. 9B is an exploded perspective view of the assembled serving implement of FIG. 9A.

As best seen in FIGS. 8 and 10, the handle 660 includes a first end 662 pivotally connected to the body 602 and a second end 664 that is releasably secured to the body 602. The second end 664 of the handle 660 includes an actuatable member 666 and a protruding member 668 that are configured to cooperate with a pair of slots 670 and 672 to secure the second end 664 to the body 602. In particular, slot 670 includes an indent 670a formed in the middle of the slot 670 and slot 672 includes a narrow portion 672a and a wide portion 672b. The actuatable member 666 includes a first projection 674 and a second projection 676.

In order to secure the second end 664 of the handle 660, the protruding member 668 is inserted through the wider portion 672b of the slot 672. At the same time, the second projection 676 is received in slot 670. Then the handle 660 is rotated so that the protruding member 668 is received in the narrow portion 672a of the slot 672 and the second projection 676 engages the indent 670a to prevent the handle from being rotated back.

To release the handle 660, a user presses the actuatable member 666, which in turn disengages the second projection 676 from the indent 672a and presses the first projection 674 into contact with the upper surface 602a of the body 602, thereby allowing the second end 664 of the handle to be released from the body 602.

In other aspects, the cover 600 is similar to the cover 300 of the second exemplary embodiment. For example, the cover 600 may also include a pair of latch members 614 configured to engage the rim 706 of the food holder 700 to hold the cover 600 on the food holder 700.

Figure 11:
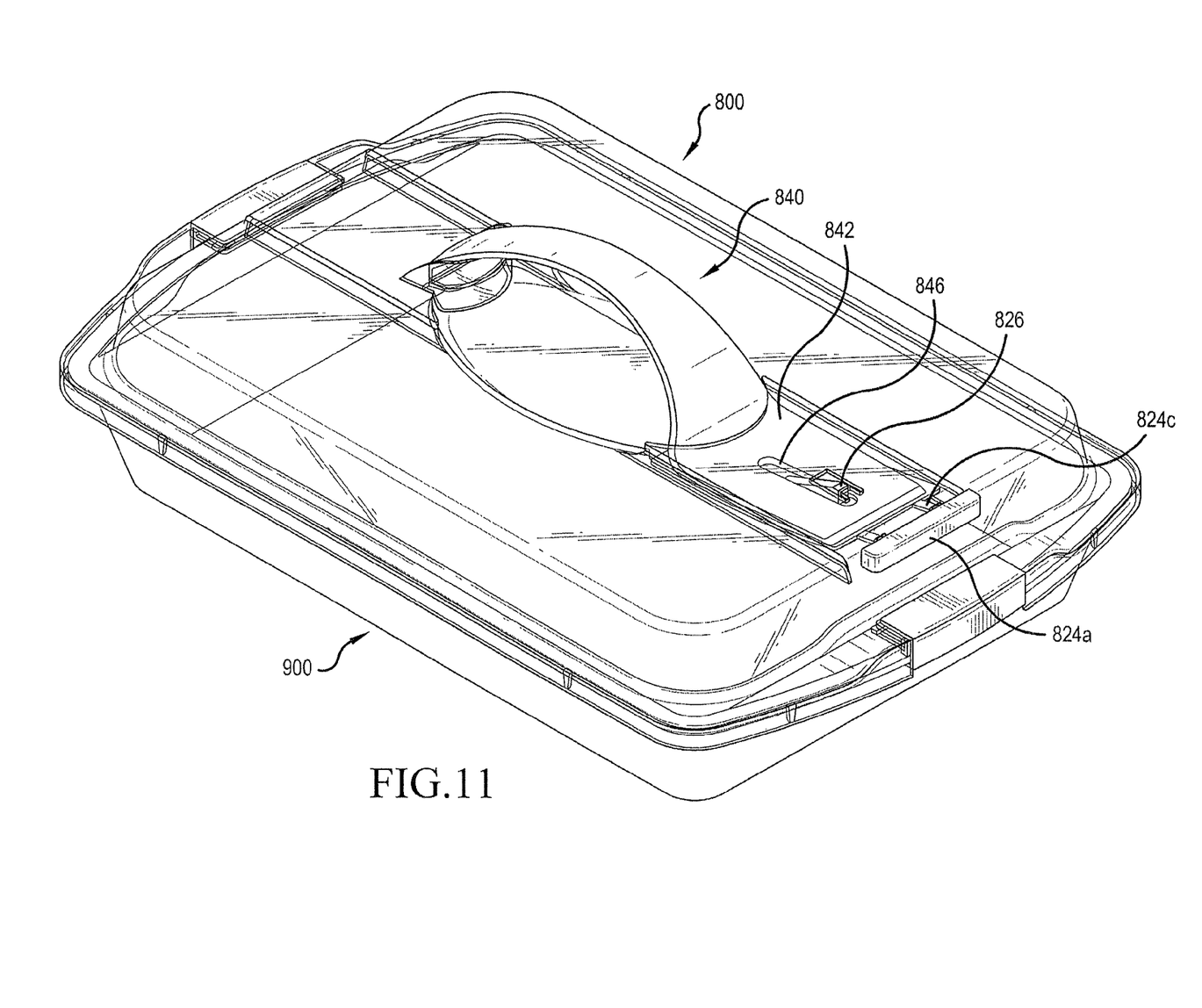
FIG. 11 is a perspective view of a cover and food assembly according to a fourth exemplary embodiment.
Figure 12:
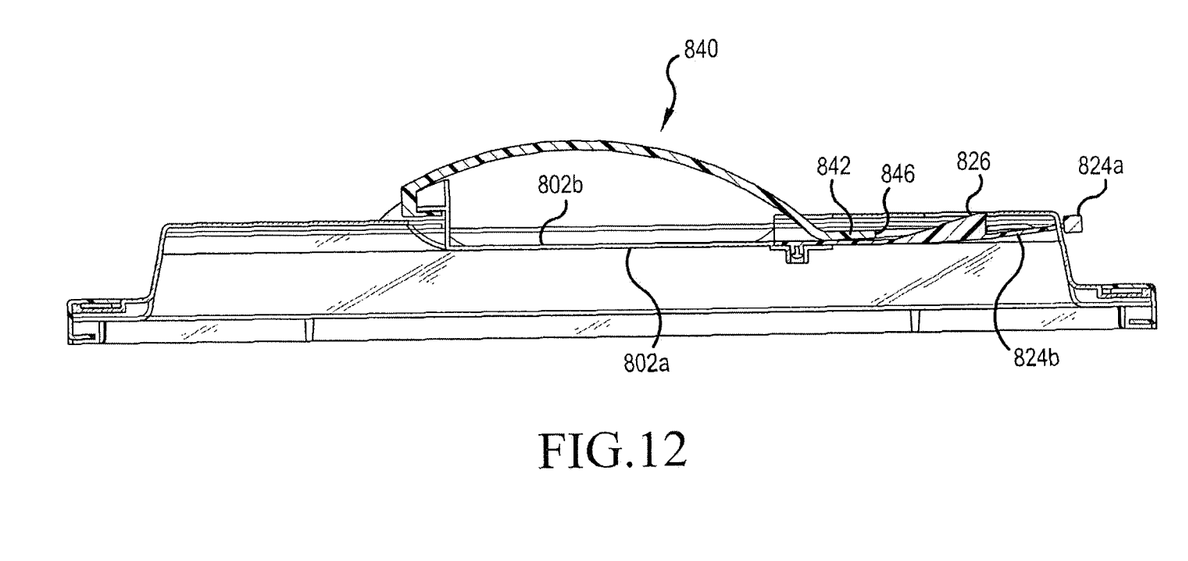
FIG. 12 is a partial cross-sectional view of the cover and serving implement of FIG. 11.

Another exemplary embodiment of a cover and food holder is shown in FIGS. 11 and 12. The cover 800 and food holder 900 are similar to the first and second exemplary embodiments described above. Therefore, only those features that are different will be described in detail. For purposes of description, the cover 800 and food holder 900 will be described with reference to a cake pan, although it is understood that this embodiment can be applied to other cover and food holder arrangements, such as for a pie pan.

The serving implement 840 of the third exemplary embodiment may be a spatula or cake server. The first portion 842 of the serving implement 840 may have a substantially rectangular shape and includes a slot 846 to cooperate with the ridge 826 of the biasing member 824. The biasing member 824 may have substantially the same shape as the first portion 842 of the serving implement 840. The biasing member 824 includes a pressable member 824a, an engagement member 824b, and a pair of struts 824c connecting the pressable member 824a and engagement member 842b. It is understood that the number of struts 824c can be varied.

The cover 800 includes a third set of apertures 817 to allow the pair of struts 824c to extend therethrough. In this manner, the pressable member 824a is located above the upper surface 802b of the body 802 of the cover 800 and the engagement member 824b is located below the lower surface 802a of the body 802 of the cover 800. The remaining features of the cover 800 and food holder 900 are similar to the second exemplary embodiment.

While the biasing member 824 is configured to releasably engage the first portion 842 of the serving implement 840 in a manner similar to that described above, the manner of releasing the engagement is different. In particular, rather than operating a separate actuatable member that presses down on the biasing member 824, a user may simply press downward on the pressable member 824A, thereby causing the ridge 826 to be withdrawn from the slot 846 of the serving implement 840 and allowing the serving implement to be withdrawn from the aperture 816 provided in the body 802 of the cover 800.

Based on the foregoing, the present disclosure provides a cover for a food holder that advantageously carries or holds the serving implement in a manner that the serving implement will not come in contact with the baked goods. In addition, depending on the shape of the serving implement, the cover may be configured in a manner where a portion of the serving implement is graspable by a user such that the grasped portion of the serving implement acts as a handle to carry the cover and food holder.

The invention thus being described, it will be obvious that the same may be varied in many ways. For example, while the third exemplary embodiment shows three circular plate members, it is understood that the number and shape of the plate members can vary. Such variations are not to be regarded as a departure from the spirit and scope of the invention, and all such modifications as would be obvious to one skilled in the art are intended to be included within the scope of the following claims.

What is claimed is:

1. A cover for a food holder, the cover comprising:
   a body having an inner surface and an outer surface, the body having at least one aperture provided therein, the at least one aperture providing communication between the inner surface and the outer surface;
   a serving implement having a first portion extending through the aperture along one of the inner and outer surfaces, and a second portion extending along the other of the inner and outer surfaces, the serving implement being releasably secured to the body by the first portion extending through the aperture,
   wherein the serving implement is a knock-down stand for displaying and serving food.

2. The cover of claim 1, further comprising a handle having one end pivotally connected to the cover and a second end releasably secured to the cover such that the second portion of the serving implement is located between the handle and the outer surface of the body.

3. The cover of claim 1, wherein the knock-down stand includes a plurality of planar members to support the food, and the cover includes a plurality of recessed portions concentrically arranged to receive a corresponding planar member.

4. The cover of claim 1, wherein the food holder is a cupcake pan, and wherein the cover further includes at least one latch to secure the cover to the pan.

5. A cover for a food holder, the cover comprising:

a body having an inner surface and an outer surface, the body having at least one aperture provided therein, the at least one aperture providing communication between the inner surface and the outer surface;

a serving implement having a first portion extending through the aperture along one of the inner and outer surfaces and a second portion extending along the other of the inner and outer surfaces, the serving implement being releasably secured to the body by the first portion extending through the aperture; and a handle having one end pivotally connected to the cover and a second end releasably secured to the cover such that the second portion of the serving implement is located between the handle and the outer surface of the body, the handle including a releasing mechanism configured to secure the first portion of the serving implement in the aperture.

* * * * *